United States Patent [19]

Bertsch

[11] Patent Number: 5,842,032

[45] Date of Patent: Nov. 24, 1998

[54] PROGRAMMABLE CONSUMER DEVICE INTERFACE

[75] Inventor: Ludo Arden Bertsch, Victoria, Canada

[73] Assignee: AISI Research Corporation, British Columbia, Canada

[21] Appl. No.: 736,138

[22] Filed: Oct. 28, 1996

Related U.S. Application Data

[63] Continuation of Ser. No. 343,612, Nov. 22, 1994, Pat. No. 5,570,085, which is a continuation of Ser. No. 826,654, Jan. 21, 1992, abandoned, which is a continuation of Ser. No. 660,924, Feb. 27, 1991, abandoned, which is a continuation of Ser. No. 361,853, Jun. 2, 1989, abandoned.

[51] Int. Cl.$^6$ .............................. G06F 13/10; G06F 13/38
[52] U.S. Cl. ................... 395/800; 395/309; 340/825.06; 340/310.08
[58] Field of Search ...................................... 395/800, 430, 395/309, 566, 200.12, 89, 333, 88; 364/DIG. 1, DIG. 2, 146; 340/310.08, 310.06, 538, 825.06, 825.22, 825.07; 379/58; 341/23

[56] References Cited

U.S. PATENT DOCUMENTS

| | | |
|---|---|---|
| 1,570,771 | 1/1926 | Hyquist . |
| 1,814,956 | 7/1931 | Ohl . |
| 2,393,021 | 1/1946 | Cheek . |
| 4,201,908 | 5/1980 | Johnson et al. .............................. 377/9 |
| 4,307,380 | 12/1981 | Gander ................................. 340/310 R |
| 4,355,303 | 10/1982 | Phillips et al. ....................... 340/310 A |
| 4,418,333 | 11/1983 | Schwarzbach et al. ........... 340/310.01 |
| 4,467,314 | 8/1984 | Weikel et al. ................... 340/825.22 X |
| 4,500,933 | 2/1985 | Chan ........................................ 364/900 |
| 4,556,866 | 12/1985 | Gorecki ............................... 340/310 A |
| 4,567,557 | 1/1986 | Burns ....................................... 364/145 |
| 4,623,888 | 11/1986 | Waring ........................... 340/825.68 X |
| 4,628,440 | 12/1986 | Thompson ............................... 364/140 |
| 4,633,218 | 12/1986 | Palsgrove et al. ................... 340/310 A |
| 4,638,299 | 1/1987 | Campbell ............................. 340/310 A |
| 4,641,322 | 2/1987 | Hasegawa .................................. 375/1 |
| 4,697,166 | 9/1987 | Warnagiris et al. ................ 340/310 R |
| 4,703,306 | 10/1987 | Barritt ................................. 340/310.08 |
| 4,704,607 | 11/1987 | Teather et al. ..................... 340/825.07 |
| 4,745,392 | 5/1988 | Ise et al. ............................. 340/310 R |
| 4,746,897 | 5/1988 | Shuey .................................. 340/310 R |
| 4,755,792 | 7/1988 | Pezzolo et al. .......................... 340/538 |
| 4,763,103 | 8/1988 | Galula et al. ....................... 340/310 R |
| 4,772,870 | 9/1988 | Reyes .................................. 340/310 R |
| 4,783,748 | 11/1988 | Swarztrauber et al. ................. 364/483 |
| 4,808,994 | 2/1989 | Riley .............................. 340/825.06 X |

(List continued on next page.)

FOREIGN PATENT DOCUMENTS 0109734   5/1984   European Pat. Off. .

OTHER PUBLICATIONS

Homenet — A Local Control Network for the Home, specifications for the Data Link Layer and Requirements for Physical Layer by General Electric.

Product information sheet — National Semiconductor LM1893 Carrier–Current Transceiver.

Signetics Linear Products, NE5050 Power Line Modem Sedayao, M.J — pp. 5–26–5.43 2, 1987.

*Primary Examiner*—Daniel H. Pan
*Attorney, Agent, or Firm*—Weingarten, Schurgin, Gagnebin & Hayes LLP

[57] ABSTRACT

A device for incorporation into a variety of consumer appliances for use in a home automation environment. The invention comprises an electronic hardware module having software resident on the module, providing an interface between an appliance and other elements on a communications system employing the "Consumer Electronics Bus" protocol. The present invention interprets data messages sent to the appliance and signals the appliance in a preprogrammed manner. Also, the invention can be programmed to generate a specific data message for transmission to another appliance. The invention accommodates the various communication media, levels of electrical noise, and operating speeds allowed by the "Consumer Electronics Bus" protocol.

10 Claims, 6 Drawing Sheets

U.S. PATENT DOCUMENTS

| | | | |
|---|---|---|---|
| 4,809,296 | 2/1989 | Braun et al. | 375/1 |
| 4,815,106 | 3/1989 | Propp et al. | 375/36 |
| 4,818,993 | 4/1989 | Stuckel | 340/825.06 |
| 4,837,701 | 6/1989 | Sansune et al. | 364/464.03 |
| 4,841,450 | 6/1989 | Fredriksson | 364/468 |
| 4,912,627 | 3/1990 | Ashkin et al. | 364/200 |
| 4,964,058 | 10/1990 | Brown, Jr. | 364/492 |
| 4,982,155 | 1/1991 | Holmberg et al. | 340/825.52 |
| 5,003,457 | 3/1991 | Ikei et al. | 364/133 |
| 5,038,211 | 8/1991 | Hallenbeck | 358/142 |
| 5,086,385 | 2/1992 | Louney et al. | 364/188 |

PROGRAMMABLE CONSUMER DEVICE INTERFACE

This application is a continuation of application Ser. No. 08/343,612, filed Nov. 22, 1994 now U.S. Pat. No. 5,570,085, which is a continuation of U.S. patent application Ser. No. 07/826,654, filed Jan. 21, 1992 now abandoned, which is a continuation of U.S. patent application Ser. No. 07/660,924, filed Feb. 27, 1991 now abandoned, which is a continuation of U.S patent application Ser. No. 07/361,853, filed Jun. 2, 1989, now abandoned.

FIELD OF THE INVENTION

The present invention relates to system remote control interfaces, in particular to remote control interfaces associated with appliances and other consumer devices operable in response to commands provided over an available medium, such as the power lines.

BACKGROUND OF THE INVENTION

The growth in electronic complexity and sophistication of consumer appliances has followed similar developments in office automation. Many appliances now contain microprocessors with memory and input/output to replace mechanical controls. These electronics initially were employed to lower manufacturing costs, but now are incorporated to enhance the appliance features. Examples include the operation of a washing machine for a variety of clothing materials with a single selection by the user, or a telephone set with memory and last-number redial.

The computer equipment in offices is now typically interconnected with a local area network so products manufactured by a variety of companies can communicate intelligently. This allows the equipment to be located where convenient for the user of the applications. Consumer appliance manufacturers are aware of the benefits that could accrue if different appliances could be interconnected in the house. An appliance would not need to be confined within one cabinet. Sensors, actuators, controls, and user interfaces could all be located throughout the house where appropriate for a task. Furthermore, the exchange of data among different appliances could enhance their capabilities.

The communication of data among the components of one appliance or among different appliances is technically possible, but not practically feasible. There are two key detriments to such a system, standards and appliance interface. Many manufacturers, trade associations, and government agencies recognize limitations imposed by a lack of standards. They also realize that solving these problems can open the development of a new industry termed "home automation" resulting in a variety of novel home automation products.

The Electronic Industries Association (EIA) is a United States trade association of manufacturers of consumer audio, video, computer, and telephone products. The EIA has organized a committee, called "Consumer Electronics Bus" (CEBus), to develop standards for interconnecting consumer appliances in a house. The CEBus committee is adopting the design principles of commercial local area networks to create communication protocols appropriate for the home environment.

The CEBus protocol description follows the established practice of the International Standards Organization (ISO). The ISO has defined a seven-layer model for a communication network, called the Open Systems Interconnect (OSI). This design abstraction allows heterogeneous products to exchange data over a network of arbitrary extent. The CEBus protocol is a published specification available to any manufacturer.

The CEBus protocol has been specialized to a typical residential environment. It accommodates six types of media, specifically infra-red, radio frequency, power line carrier, twisted-pair wires, coaxial cable, and fiber optic cable to provide a shared communication resource, termed a "bus," that may be used by many appliances.

The CEBus implements four of the "layers" of the OSI communications model:

layer 1: Methods of impressing digital data on each medium.

layer 2: Methods of organizing binary data into meaningful messages (a sequence of bytes).

layer 3: Methods of routing messages among appliances and among the six media.

layer 7: A language for representing commands issued from one appliance to another to effect control.

The CEBus also provides a variety of media options so appliance manufacturers have a variety of migration paths for expanding appliance capabilities at the lowest cost and inconvenience. Nevertheless, manufacturers wishing to adopt CEBus face dilemmas regarding how an existing appliance can be made compatible and functional with CEBus, and how a manufacturer can adapt appliances to CEBus in "stages" without major redesign.

There are no known appliance apparatus that implement the CEBus protocol and can accommodate a variety of appliances without significantly disrupting the existing appliance functionality.

SUMMARY OF THE INVENTION

The present invention provides easy and direct adaptation of consumer appliances to a home automation system utilizing the so-called CEBus protocol of the Electronic Industries Association. The invention embodies electronic hardware and software all contained on a single small (typically 2¾" by 3½") printed circuit board to which the appliance or other consumer device can be connected without significant redesign.

The present invention is intended to be located inside an appliance to permit the appliance to communicate data using the CEBus protocol. Appliances used for home automation are typically connected to a communications network in order to control other appliances, to be controlled by other appliances, or to report a measured environmental parameter.

The present invention offers a universal interface for a variety of appliance types and for all CEBus communications media. The interface is logically interposed between the control electronics in the appliance and the communications medium. There is no requirement for appliances to contain special electronics to use this interface. Appliances without a microprocessor or with a microprocessor that is fully committed to internal appliance functions can be accommodated. The interface translates CEBus commands to signals that are appropriate for the capabilities of the appliance; conversely, signals from the appliance can cause specific CEBus commands to be sent to a designated appliance.

Adaptation to appliances with differing input/output arrangements and to various media is possible by remotely configurable software and modules that plug onto the invention.

According to the present invention, signals between the interface and the appliance are presented on two parallel sets of pins. Eight input pins and eight output pins are programmed independently. Each pin selectively conveys data and selectively indicates the completion of an operation in the appliance. Separate pins are available to implement a full handshake protocol between the interface and the appliance. This acknowledges processing of input/output data by the recipient so the next data may be placed on the pins without loss of data.

The components internal to some appliances are interconnected by a common bus. The input and output pins of the invention have the capability of connection to a bus. Both sets of pins can be operated in a high impedance mode when the interface and the device are not signaling to each other. Acknowledgment via designated data pins or via the dedicated handshake pins is available.

Furthermore, the link between the interface and the appliance may use a serial port that incorporates the industry-standard RS-232 serial protocol or other serial protocol. The software in the invention sets the parameters for speed and data format. Both raw binary data and ASCII-encoded binary data may be sent in this mode.

The invention contains special provisions for adaptation to many configurations of a power line carrier medium, a twisted pair medium and other media. These are implemented by configuring the software contained in the invention, and are described in the next section.

The invention contains a flexible array of programmably selectable features. These accommodate a large spectrum of appliance capabilities and transmission media characteristics. The invention is adapted to a particular operating environment by configuring the resident software.

Configuration is typically accomplished by programming the invention during the process of assembling the appliance. Alternatively, a sophisticated controller in the house may program or alter the program contained in the interface of an appliance. Thus the invention can be configured statically, prior to use, or dynamically during operation. This permits an appliance to adapt to changes in the properties of a transmission medium, if, for example, the appliance is moved from one house to another.

BRIEF DESCRIPTION OF THE DRAWING

These and further features of the present invention will be better understood by reading the following detailed description, taken together with the drawing, wherein.

Figure 1:
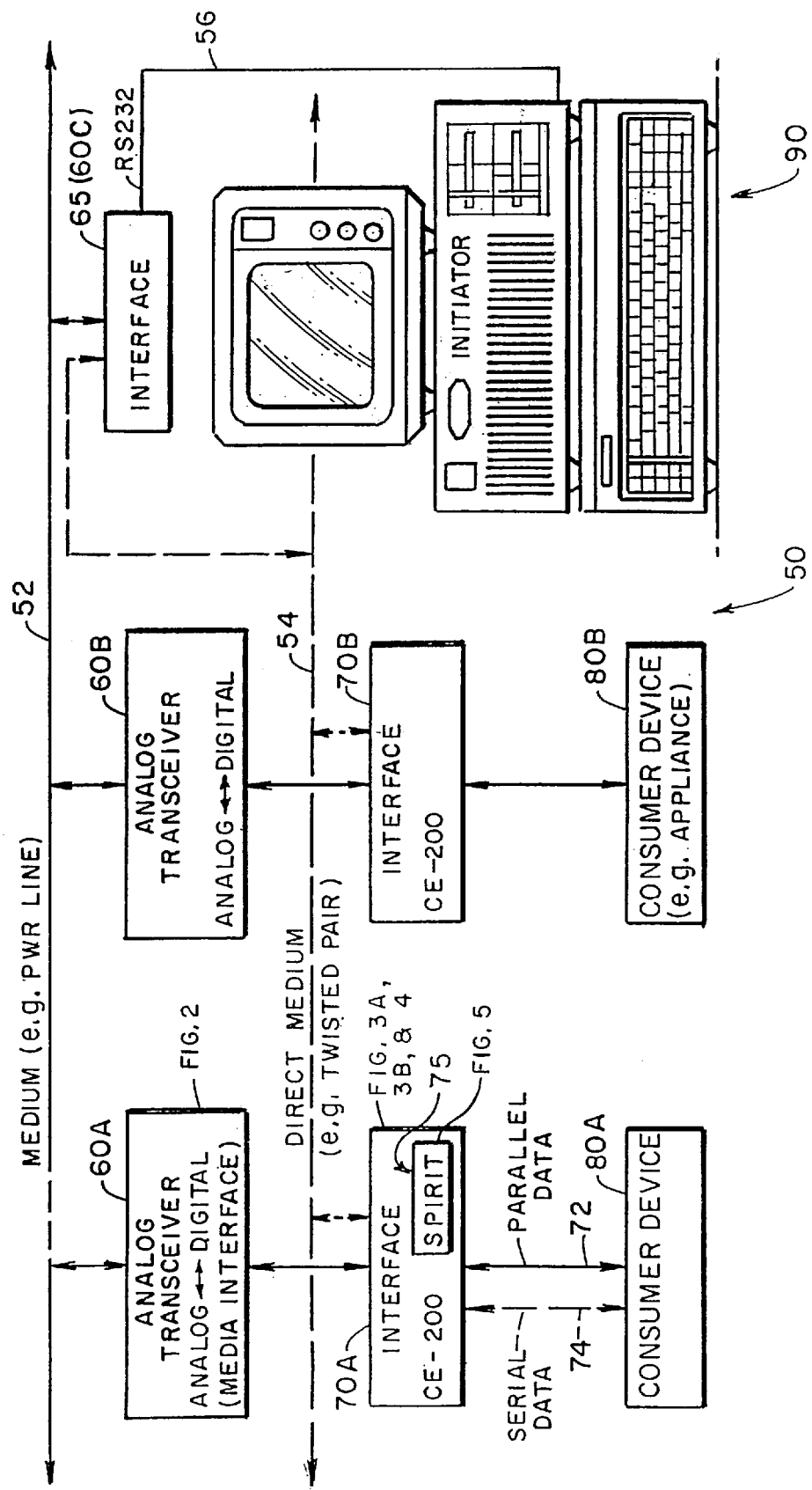
FIG. 1 is a block diagram of one embodiment of an appliance control system according to the present invention.

Also included are the following appendices:

Appendix I delineates initiator commands via the serial port;

Appendix II delineates the specification for the Cal Packets sent over the media; and Appendix III delineates specifications of the EE Prom storage.

DETAILED DESCRIPTION OF THE INVENTION

The invention is primarily responsible for providing the above-mentioned layers 2 and 7 communications to the appliance. Layer 7 deals with the CEBus language used to convey information among appliances. The formation of a packet containing data for transmission is defined in layer 2.

Layer 1 is the physical layer of the OSI model. It encodes the binary digits constituting the data into an electrical signal appropriate for the physical characteristics of the communications medium. According to the present invention, a plug-on media interface module is available to adapt the invention to any selected CEBus medium, as listed in the background to this invention.

The layer 2 contains two sublayers. The first sublayer comprises the "logical link control" and describes the composition of a data packet. This sublayer includes the arrangement of bytes used for identifying the type of packet, the data content of the packet, and special bytes for assisting the detection and correction of transmission errors. Whereas the logical link control is independent of the communication medium, the lower sublayer, a "medium access control," is adapted to the specific medium.

The software configuration applies primarily to the medium access control of layer 2 and to layer 7, discussed above. Specifically in layer 7, configuration software is run on a personal computer containing a link to the appliance interface invention. This software contains a data base of the CEBus messages. Messages appropriate for the appliance are selected, along with signaling and timing parameters, and sent electronically to the interface for executing configuration.

By incorporating the invention, the appliance is relieved of the responsibility for interpreting and generating CEBus messages. Instead, the invention is configured to recognize a subset of the CEBus messages intended for the appliance containing the invention interface.

The interface interprets a CEBus message and causes software-selected parallel lines to enter prescribed states for prescribed times. Alternatively, the interface may send a prescribed sequence of characters of binary data on the serial line to the appliance. Thus a CEBus message is automatically translated to a signal format that is appropriate for the capabilities of the appliance.

Similarly, the interface can be configured so that selected signals from the appliance cause a message to be sent from the interface onto the medium. The association of appliance signals and detailed timing are fully programmable by software configuration of the invention.

In addition to associating messages with signal lines of the appliance, the interface can be programmed for "explicit" or "implicit" modes of communications for "output messages" issued to an appliance.

In the explicit mode, the appliance is expected to issue a return message in response to receiving a specific message. The invention can be configured to acknowledge a specific message upon receipt or to recognize a particular signal on the serial or parallel lines from the appliance as an indication that the appliance has performed an operation requested by the previous message. The interface then generates a return message to acknowledge execution of the appliance operation. Acknowledgement of the appliance operation is termed the "handshake mode" of the invention. In the implicit mode, no acknowledgment message is issued.

Configuration is provided for an appliance to request acknowledgment upon transmission of a "response message" to another appliance. The interface receives the acknowledgment, interprets one of four states (REJECT, ERROR, TIMEOUT, GOOD RESPONSE), and signals the appliance via the serial or parallel ports.

With respect to layer 2, media access control sublayer, the invention includes the ability to adapt to a range of parameters for communicating on power line carrier or twisted pair wire media.

The selected operating parameters include the selection of communication data rates in the range of 500 "one" bits/s to 40,000 "one" bits/s.

Note that the CEBus protocol uses pulse width modulation. The shortest pulse represents a binary one. A binary zero is a pulse nominally twice as long. Two other symbols complete the alphabet: "end of message," nominally three times a "one," and "end of field," nominally four times a "one."

The size of the smallest pulse that is to be considered valid and not noise is also selectable, as is the pulse width to distinguish a binary one from a binary zero, and the threshold for a pulse width below which it is considered noise and is ignored.

A selectable configuration parameter is provided for determining whether signals higher than the noise threshold and lower than the signal threshold are ignored or are combined with the next symbol pulse.

With respect to the expected delay between the transmission of a data pulse from the interface and the reception of the same signal from the physical layer circuits that constantly monitor the medium, a selectable parameter accommodates variations in circuit delays at the physical layer. The physical layer protocol for the power line carrier and for twisted pair wires both use a contention bus. Each transmitter is responsible for monitoring the bus while transmitting to determine if another appliance is sending data simultaneously. The CEBus protocol specifies corrective actions if a "collision" of signals is detected so that orderly communications are possible.

A block diagram of one embodiment of the present invention 50 is shown in FIG. 1 wherein a medium 52, such as the power line, receives signals from elements of the system including analog tranceivers 60 which provide analog communication signals to the medium 52 and digital data to and from subsequent portions of the system according to the present invention. The digital data provided by the analog tranceiver 60 is provided to and received from the interface 70 which provides control signals to the selected consumer device 80.

According to an alternative embodiment of the present invention, the interface units 70A and 70B may be directly connected through a direct medium 54 such as a twisted wire pair. The interface 70A transfers control data to the consumer device 80A and receives signals from the consumer device 80A through a parallel data path 72, or in an alternative embodiment through a serial data path 74.

According to one embodiment of the present invention the interface units 70 are comprised of substantially identical hardware structure and include programmable elements therein having substantially identical software initial configuration. However, according to the present invention the interface units 70A and 70B are individually programmable to be initialized, adopting a specific address and responding to a selected set of commands as provided by other interconnect units and responding to or initiating actions by select signals provided by the consumer device 80. The system according to the present invention, particularly the interface 70A or 70B, in one embodiment is initialized by an initiator 90. Typically a programmable system, such as an IBM PC, provides commands through an initiator media interface 65 (which may comprise a media initiator 60) to the particular medium (52 or 54) wherein each interface unit 70 is initially configured to respond to a specific address and particular commands which identify the succeeding data as program configuration data. Such program configuration data is provided by the initiator 90 through the interface 65 and is stored in an interface (70A) in a permanent, semi-permanent or temporary memory, discussed below. Upon completion of initialization address and command storage in the interface unit 70, the initiator 90 and the interface 65 may be removed from the transmission medium.

According to a further feature of the present invention, the interface units 70 monitor the transmission conditions and appliance performance. If the transmission conditions or appliance activity is determined to be of a particular nature, i.e., exceptionally noisy transmission or erratic appliance performance, a first interconnect unit 70A which detects such conditions may issue a command sequence to the other communicating interface unit 70B and cause a change in parameters of the unit 70B. The changed parameters cause the interface 70B to change its operation, to preferably correct or compensate for the observed change in media or appliance operation. The changed parameters can be selectively made permanent or temporary. If permanent, the changed operation of the interconnect 70B will be maintained for subsequent operations of the consumer device 80. When temporary, the prior operation of the interface 70B will be resumed upon subsequent power-up or other signal to indicate the return to previously initialized parameter values.

Therefore, the system 50 and system elements according to the present invention provide apparatus and methods of appliance control which is selectively adapted to a variety of media and consumer devices, while maintaining a minimum of changes in hardware and software.

Figure 2:
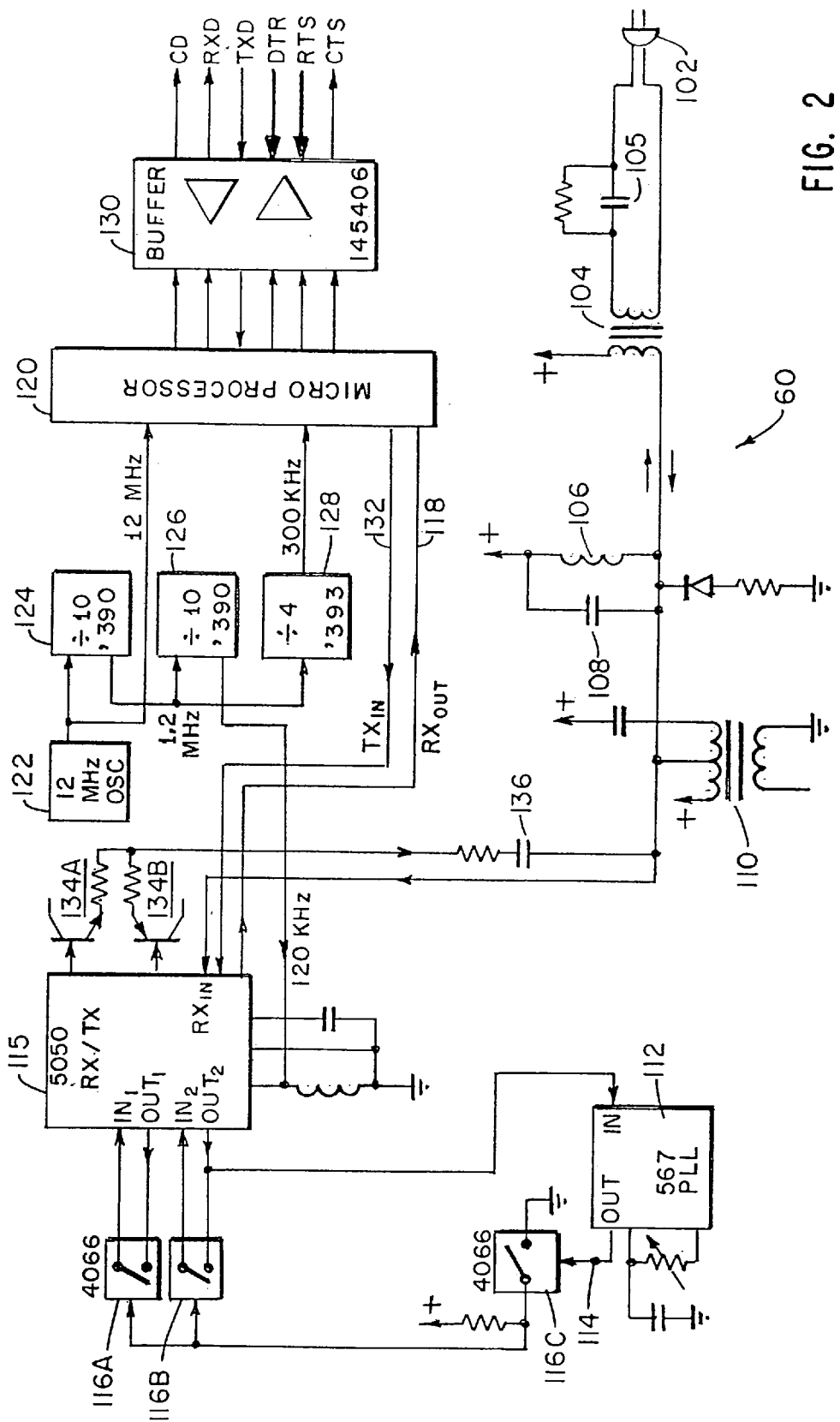
FIG. 2 is a partial schematic diagram of the analog tranceiver shown in FIG. 1.

The media transceiver 60 is shown in more detail in the schematic diagram of FIG. 2. The particular medium illustrated in the transceiver 60 is operable with a power line medium, to which it connects by a plug 102 and provides a signal path through a pulse type transformer 104 and coupling capacitor 108. The signal transferred between the tranceiver 60 and the power line medium is typically a low frequency RF signal above the audio frequency range, such as 120 KHz. A band pass filter having the corresponding resonance is provided by inductor 106 and capacitor 105. Transformer 110 is connected to provide filtering. The signals provided by the power line medium to the tranceiver is received by a power line interface integrated circuit 115, typically part No. 5050, manufactured by Signetics Corporation. The product specification and application data provided by the manufacturer of the 5050 integrated circuit is hereby incorporated by reference. A phase lock loop 112 is connected to receive the buffered input signal, whereupon successful acquisition of the received 120 KHz signal, as represented by an output on lead 114, indicates that the received signal is of acceptable quality. If the received input is acceptable in quality, the buffered input signal is allowed to pass to the remaining portions of the receiver circuit 115 by operation of analog switch elements 116A, B and C. The media interface circuit 115 provides an output signal on lead 118 which corresponds to the signal received from the power line medium. The signal on lead 118 is received by microprocessor 120 which is programmed to provide carrier detect (CD) and received data (RXD) according to the format of the media signals. The format may include any one of several signaling formats, such as the CEBus standard adopted in the present invention. Programming of the microprocessor 120 is accordingly programmable to provide the desired signals.

A 12 MHz oscillator 122 provides a system base time reference which is divided by dividers 124, 126 and 128 to provide 1.2 MHz, 120 KHz and 300 KHz signals respectively. The 12 MHz signal is received by the microprocessor 120 for program execution. The 120 KHz signal is received by the media interface circuit 115 at corresponding oscillator input connections. The 300 KHz signal is received by the microprocessor 120 to provide timing information as used by the microprocessor in execution of the stored program. Alternative microprocessor 120 programs may necessitate a different, more advantageous frequency which may be provided according to the present invention.

The microprocessor 120 receives the transmit data (TXD) signals from the interface units 70A, 70B, ... and indicates to the interface unit the data transmit ready (DTR), ready to send (RTS), and clear to send (CTS) signals according to accepted RS-232 signal protocol. The TXD signal is provided to the media interface circuit 115 via lead 132 whereupon a signal resulting from the received 120 KHz clock signal is modulated and provided to drive transistors 134A and 134B according to suggested operation of the integrated circuit. The drive transistors provide the corresponding transmitted signal to the power line through coupling capacitor 136, transformer 104 and capacitor 105. The possibility of spurious signals is reduced by the band pass filter provided by capacitor 108 and inductor 106.

Figure 3A:
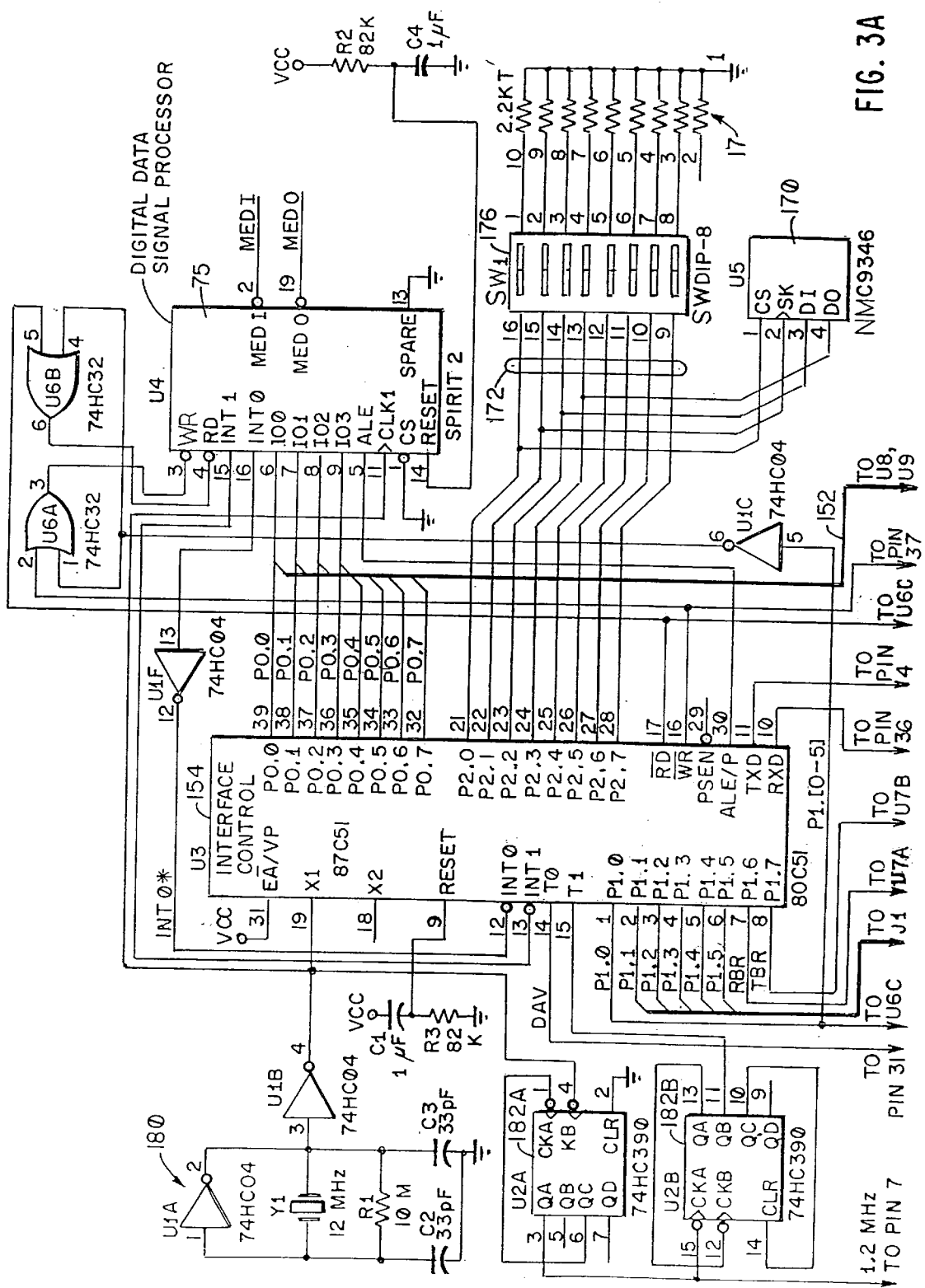
FIGS. 3A and 3B are schematic diagrams which taken together form the interface of FIG. 1.
Figure 3B:
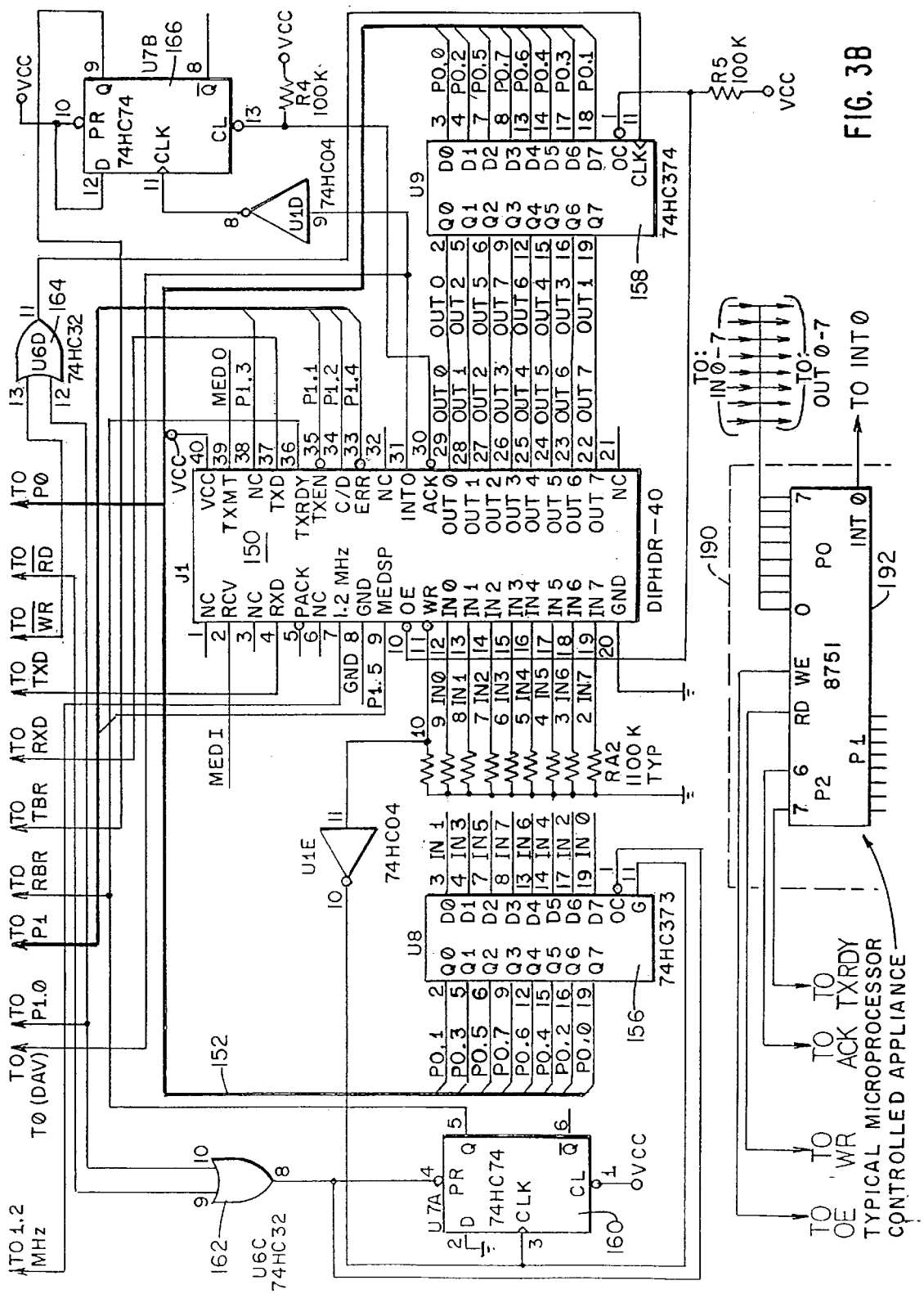

The interface unit 70 is shown in more detail in FIGS. 3A and 3B whereupon the signals provided by the media tranceiver 60 is received at connector 150, as shown in FIG. 3B, with particular reference to the media receive and transmit pins 2 and 39, which are connected to the digital data signal processor 75 shown in FIG. 3A and in FIG. 1. The digital data signal processor 75, shown in further detail in FIG. 5 and discussed in more detail below, receives the media signals as provided by the output of the media tranceiver 115 and provides parallel signal paths 152 to the interface controller 154 and to the appliance signal buffers 156 and 158 respectively. The parallel data paths 152 comprise a four-bit data path for transfer of data between the buffers 156, 158 and interface controller 154, and between interface controller 154 and digital data signal processor 75, as well as directly between the digital data signal processor 75 and the buffers 156 and 158. The buffers 156 and 158 are connected to the interface controller 154 with four additional signal paths to provide an eight-bit signal path. The buffers 156 and 158 are connected to provide a signal path to the connector 150 wherein an eight-bit parallel input path is provided to buffer 156 on pins 12–19 and an eight-bit output data path (to the appliance) is provided by pins 22–29 of connector 150, from buffer 158. An exemplary interface connection to a typical microprocessor (192) controlled appliance 190 is also illustrated in FIG. 3B. When a write signal is provided on pin 11 of connector 150, the flip-flop 160 provides an RBR signal to the interface controller 154 and also enables the buffer 156 to pass the received data from pins 12–19 to the microprocessor 154 via bus 152. The data provided by buffer 156 is placed on the bus 152 upon the receipt of an enable signal from gate 162 as provided in response to a microprocessor read signal issued on pin 17.

Similarly, data to be transmitted from the interface unit 70 and the selected consumer device 80 is provided by data transferred from the interface control 154 or the digital data signal processor 75 over bus 152 via buffer 158, comprising an eight-bit storage register. The data is stored in the buffer 158 upon receipt of a signal provided by gate 164 in response to a write signal issued by the interface controller 154 on pin 16 and an enable signal issued on pin 1. The output pins 22–29 are made active upon receipt of an output enable signal on pin 10 of plug 150. Also according to the present invention, the appliance may explicitly signal the receipt of the data by asserting the interrupt INTO line on pin 31 which produces a change of state of the flip-flop 166 causing a TBR signal to be produced on pin 8 of the interface controller 154. The asserted signal status is removed by an acknowledge signal produced by the appliance and placed on pin 30 of plug 150, which resets the flip-flop 166. Additionally, the digital data signal processor 75 may be polled by the interface controller at units 282 and 286 in FIG. 4 to provide indication of transmission of reception of data.

Transfer of data into and out of the digital data signal processor 75 is controlled by read and write signals on pins 3 and 4 of the digital data signal processor 75 which result from read and write signals provided by pins 17 and 16 of the interface control 154 and by assertion of pin 1 of the interface controller 154 to a high state.

Figure 4A:
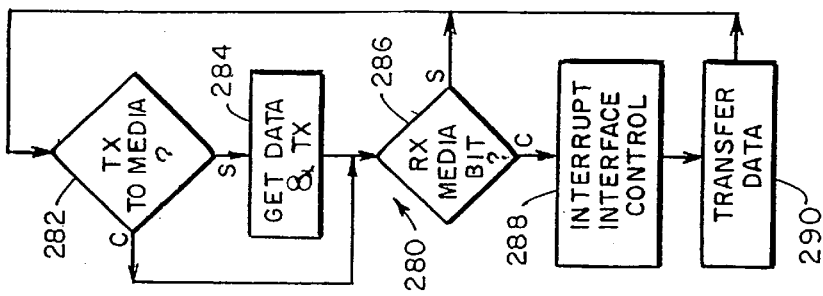
FIG. 4A is a flow chart of an interrupt routine of FIG. 4.

As previously discussed, externally applied programming signals are stored in the interface unit 70. The signals which are to be stored in a permanent or a semipermanent fashion are directed to an electrically erasable programmable read only memory (EEPROM), 170, typically a part No. NMC 9346 manufactured by National Semiconductor, Inc., and connected to the interface controller 154 via four leads of an eight-bit data bus 172. Moreover resistors 174 are selectively connected to the data bus 172 by corresponding switches 176, which change the unasserted state of the leads comprising bus 172 from a high state to a low state when closed. Thus, the interface unit 70 can receive selectable hardware changes as desired and implemented by the appliance manufacturer or the system configuration engineer wherein such hardware customization is reflected by selectable switch 176 positions. Moreover, as the resistors 174 provide sufficiently low loading of the signal leads, signals of a different state may be asserted over the leads without interference. For instance, the EEPROM 170 transmits and receives signals over a four bit portion of the bus 172. Such signals comprise a chip-select signal, a clock signal, a data input and a data output signal. Alternate memories which can be substituted comprise other signals which can be accommodated without undue experimentation. Thus, according to the preferred embodiment of the present invention, data provided by the initiator 90 (FIG. 1) is received by the digital signal processor 75 through the media tranceiver 60 and connector 150, buffer 156 and bus 152, wherein the resulting parallel data signal is passed to the EEPROM 170 at memory locations and in a format determined by the interface control 154 which receives the signal provided by the digital data signal processor 75. Subsequent to completion of receipt of configuration data in the EEPROM 170, or upon subsequent power-up conditions as provided by reset signals on interface control 154, pin 9 or digital data signal processor, pin 14 (from corresponding R-C startup circuits), the data stored in the EEPROM 170 is transferred to the interface control 154 via a portion of the bus 172 through the interface control 154 to registers in the digital data signal processor 75 via a portion of the bus 152. The operation of the data transfer is described in more detail with regard to the flow charts of FIGS. 4 and 4A, discussed below.

The interface control 154 comprises a programmable microprocessor, such as part No. 87C51 produced by Intel Corporation and others, which includes thereon a programmed memory which provides the operation of the interface control unit 154. Timing signals to the interface control unit 154 are provided by a 12 MHz clock 180 and dividers 182A and 182B providing 1.2 MHz and 300 KHz timing signals, in a manner similar to that described with reference to the tranceiver 60 of FIG. 2. Accordingly, in an alternate embodiment to the present invention, a common clocking signal may be provided, such as is indicated on pin 7 of plug 150 to be used by the tranceiver 60 or to allow synchronization with the consumer device 80.

Figure 4:
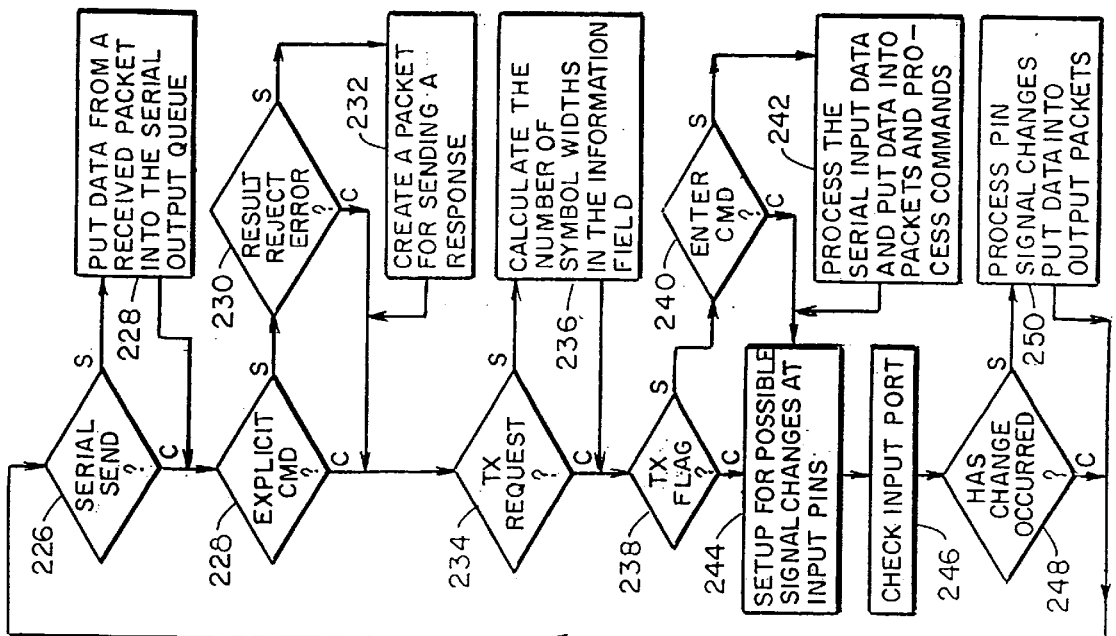
FIG. 4 is a flow chart showing the overall operation according to one embodiment of the present invention.
Figure 4:
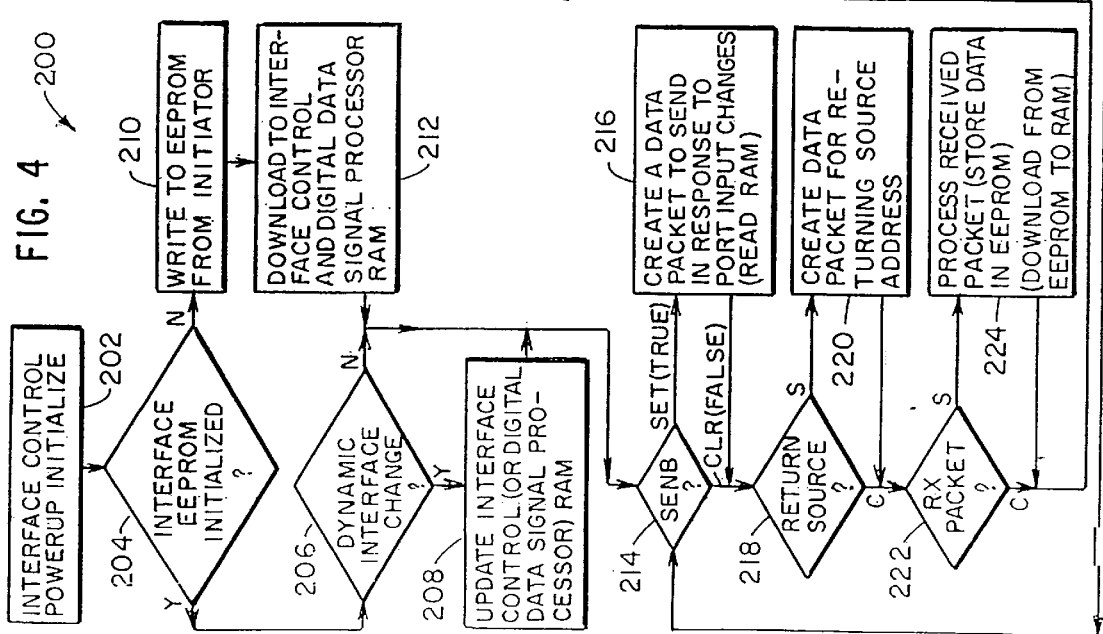

The programmed operation of the interface unit 70, as illustrated in FIGS. 3A and 3B, is set forth in the overall flow chart 200 of FIG. 4. The interface controller is initialized in a power-up sequence 202 and then is receptive to subsequent signals, illustrated in Appendices I and II, as received from the media via connector 150 through the digital data signal processor 75.

The digital data signal processor 75 operates according to a sequence generally illustrated by flow chart 280 wherein if data is to be transmitted 282 the data is received from the interface controller 154 or the buffer 156 and transmitted to the media output pin 39 of unit 150 onto the tranceiver illustrated in FIG. 2, at step 284. If an incoming media signal is received 286, the digital data signal processor 75 sends an interrupt signal to the interface controller (pin 13) step 288 and transfers the data to the interface control 154 or 158 at step 290.

If the interface 70 has already been initialized (initialized data being stored in the EEPROM 170) the received data will be examined to determine if a header signal is received which indicates that a subsequent or dynamic change in interface parameters is to be provided, step 206. If such dynamic interface modification is to be provided, the interface control unit RAM locations, such as on the interface control 154 and digital data signal processor 75, receives an updated signal, step 208, whereupon a normal operating routine begins. If the interface has not been initialized, step 204 upon receipt of an initialization signal, data is written in the EEPROM 170 from the initiator 90 according to step 210, as illustrated by Appendix II, and subsequently downloaded to the interface control and digital data signal processor RAM at step 212.

In response to received commands, as illustrated in Appendix II, the interface determines if a data byte should be sent at step 214, and provides a data packet in response to accordingly requested signals. Also included, according to the present invention, is the capacity of the present system to monitor the status of the interface control unit, including the digital data signal processor 75, as well as the consumer device connected thereto. This information is also provided at step 216. Thereafter, if a command is provided to the interface directing that data should be returned to the source, step 218, a data packet is created at step 220. If a command is received by the interface control to receive a packet at step 222, the received data packet is processed at step 224. Also included in this step of processing the received packet is the storing of subsequent interface modification data in the EEPROM and downloading the signals from the EEPROM to the RAM, at step 224. If data is to be sent serially as indicated by a corresponding command at step 226, the received data is placed in a serial queue and transmitted at step 228. If the command to be performed is an explicit command as detected at step 228, and if handshaking is to be provided wherein the result is rejected if an error is present, step 230 the interface causes a packet to be created for a response at step 232. If a received command requests transmission at step 234, the number of symbol widths in the information field is calculated at step 236 and the transmit flag is awaited at step 238. If the transmit flag is received, the command is entered, step 240, and the serial input data is processed and placed into data packets, and the commands processed, step 242. At step 244, changes to input port to recognize are set up. At step 246, the input port pins (150) are checked. Step 248, checks to see if valid changes to input port are made. At step 250, commands are sent out to media if cal commands are correct.

Figure 5:
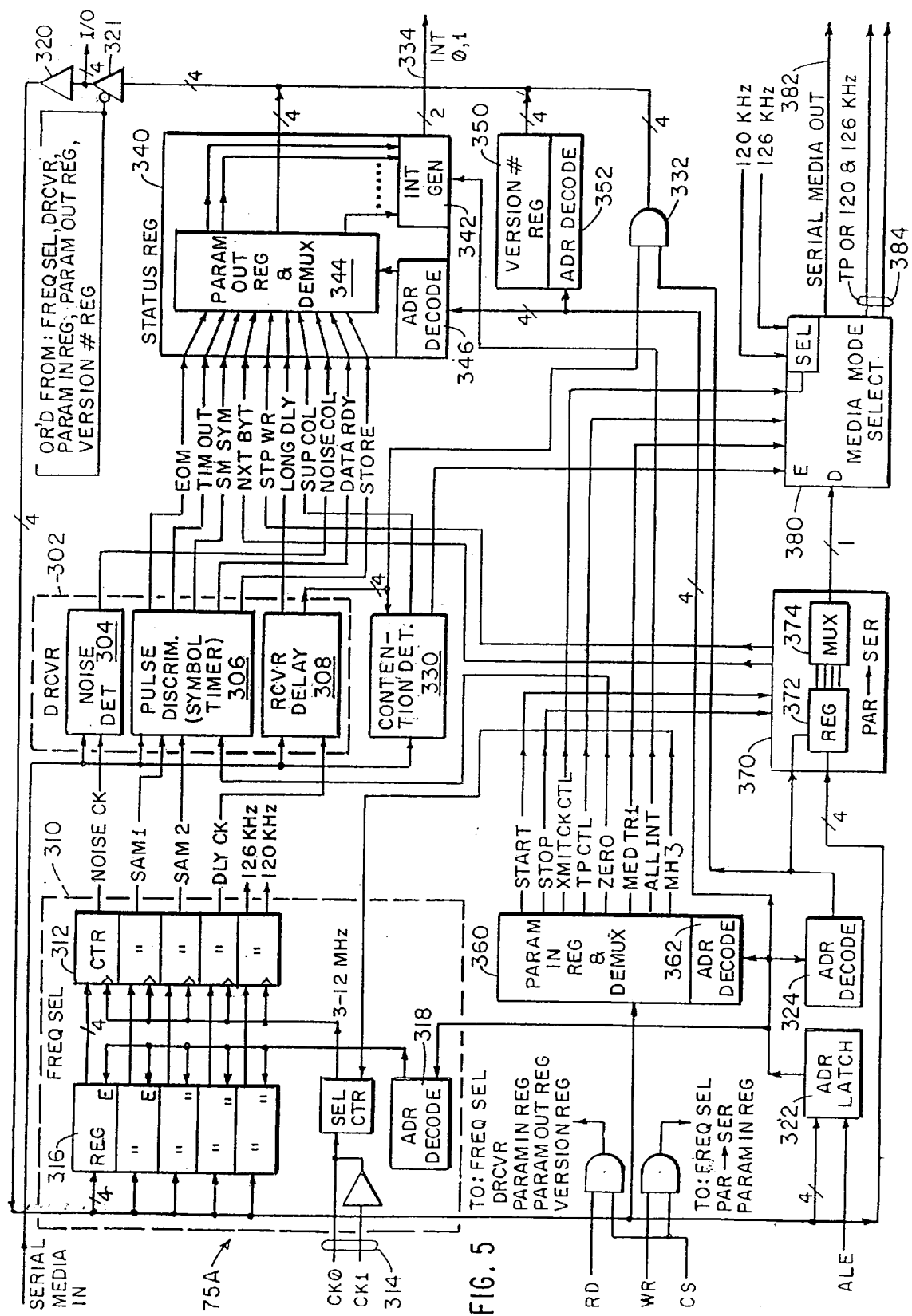
FIG. 5 is a block diagram of the Digital Data Signal Processor circuit of the interface shown in FIG. 1.

The digital data signal processor 75 is shown in more detail in the block diagram 75A of FIG. 5. The serial media signal is received from the tranceiver of FIG. 2 (via pin 2 of plug 150) by a digital receiver 302 including a noise detector 304, a pulse discriminator 306, and a programmable receiver delay 308. The components of the digital receiver 302, as well as other portions of the digital data signal processor 75, are made selectively operable according to particular clock frequencies combined with the internal logic and the received data. The selectable clock frequencies are provided by a frequency selector 310 which includes a plurality of programmable counters 312 operable in response to an externally received clock signal 314 and a digital signal which presets the counters 312 to count to a selected value. The preset signals are received by storage registers 316, typically including RAM or flip-flop registers and received four-bit parallel signals from I/O input leads (pins 6–9) via buffers 320. Since the digital data signal processor 75 includes additional addressable registers, the frequency selector 310, registers 316, are responsive to a particular address signal, which is received by an address latch 322 and decoded by an address decoder 318. The address signal is received by the address latch 322 before the corresponding data and stored in the latch upon occurrence of an address latch enable signal (ALE). Furthermore, storage of data into selected addressable registers is responsive to a write signal (WR) and a chip select signal (CS). The received serial media signal is reformatted into a four-bit parallel signal by the digital receiver 302 and placed on the I/O signal leads through buffer 321 when the gate 332 receives an enable signal from the address decoder 324 which responds to a selected address signal provided by the address latch 322. As previously mentioned, interrupt signals provided by the digital data signal processor may selectively interrupt the interface controller 154. Such interrupt signals 334 are provided by an interrupt generator 342 which is responsive to selective signals provided by the digital receiver 302 indicating the presence of a received signal, end of message or other data condition.

According to a feature of the present invention, the digital data signal processor 75 is operable to provide status information to the interface controller 154 by a plurality of status symbols, stored in registers or generated by various elements of the digital data signal processor 75. In the preferred embodiment, the status register 340 receives ten status signals from the digital receiver and other elements of the digital data signal processor 75. A four-bit multiplexor 344 selects the status signals four at a time, and provides such signals to the I/O signal leads via buffer 321 upon receipt and decoding by decoder 346 from the address latch 322. In addition, the present invention provides a prestored version number stored in a register 350, also selectively addressable when the corresponding address signal is decoded (352) whereupon such version number is placed on the I/O leads and received by the interface control 154 and provided to other units requesting such information.

In addition, providing selected operating parameters of the digital data signal processor 75 which are selectively controlled according to the signals stored in a parameter input register 360 four-bit input signals are demultiplexed and stored in input register 360 upon receipt and decoding of a corresponding address signal (362) from the address latch 322. In the preferred embodiment, the parameters to be selectively controlled include the frequency select input clock frequency, the digital receiver 302, pulse discriminator (symbol timer), the interrupt generator 342, and the serial output transmit elements, including the parallel to serial register and multiplexor 370 and the media mode select element 380, discussed below.

According to the preferred embodiment of the present invention, the signals received by the parameter input register 360 and provided by the status register 340 are addressably selected according to the following table.

TABLE I

ADDRESS MAP DIGITAL DATA SIGNAL PROCESSOR
The following is the internal mapping of the chip.
A rising edge of ALE latches in data from the four I/O pins (I/O0, I/O1, I/O2, I/O3) and selects the internal register which will be accessed. On RD or WR pulses, the information will written to or read from the appropriate register.

| ADDRESS | BIT3 | BIT2 | BIT1 | BIT0 |
|---|---|---|---|---|
| 0 0 0 0 | DATA RECEIVED FROM/TRANSMITTED FROM MEDIA | | | |
| 0 0 0 1 | ---------- | ---------- | ---------- | ---------- |
| 0 0 1 0 | NEXTBYTE | SMALLSYM | TIMEOUT | EOM |
| 0 0 1 1 | NOISECOLL | SUPCOLL | LONGDELAY | STOPWR |
| 0 1 0 0 | | | STORE | RXDATA |
| 0 1 0 1 | ---------- | ---------- | ---------- | ---------- |
| 0 1 1 0 | TWISTEDPAIR | 125KH2/TP | START | STOP/CLEAR |
| 0 1 1 1 | 3 MHz | INTERUPTS | MEDOUTTRI | ZERO |
| 1 0 0 0 | ---------- | MEDIA CLOCK | | ---------- |
| 1 0 0 1 | ---------- | SAMPLE 1 CLOCK | | ---------- |
| 1 0 1 0 | ---------- | SAMPLE 2 CLOCK | | ---------- |
| 1 0 1 1 | ---------- | NOISE CLOCK | | ---------- |
| 1 1 0 0 | ---------- | DELAY CLOCK | | ---------- |
| 1 1 0 1 | ---------- | (CLOCK TBA) | | ---------- |
| 1 1 1 0 | ---------- | VERSION NUMBER | | ---------- |
| 1 1 1 1 | ---------- | VERSION NUMBER | | ---------- |

Data to be serially transmitted is first received in a four-bit parallel format via the I/O lines through buffer 320. The parallel data is stored in a register 372 and selectively and sequentially multiplexed by multiplexor 372 providing a serial stream of data, which is received by a media mode select element 380.

According to the present invention, several different media are usable in the present system, including a serial output signal as provided on lead 382 and a twisted pair 384. The media mode select element 380 further provides control of additional media format and data rate, according to parameter signals stored in the register 360 and as clocked by a clock signal provided by a programmable counter in the frequency selector 310. As the present invention envisions connection to unsupervised media, wherein unintended simultaneous transmissions (collisions) may occur, the apparatus according to the present invention includes a contention detection element 330 which inhibits transmission on media by the media mode select element 380 upon receipt of media signals within a delay specified by the receiver delay 308. In addition, the collision of signals is indicated by a status signal provided to the register 340 and selectively readable by the interface controller 154 which can selectively provide such status symbols to other elements connected thereto.

Modifications and substitutions to the present invention made by one of ordinary skill in the art is considered to be within the scope of the present invention, which is not to be limited except by the claims which follow.

Appendix I

Initiator Commands Via the RS-232 Serial Port

All commands start with an SOH (hex 01).
The SOH is followed by a command code. This code must be less than 7 or it is taken as a size for an incoming packet. On some commands there are parameters, etc.

| Command | Description |
|---|---|
| `<SOH><0>` | - returns `<SOH><0><source address>` |
| `<SOH><1>` | - returns `<SOH><1><source address>` |
| `<SOH><2><new_source>` | - returns `<SOH><2><new_source>` |
| `<SOH><3>` | - returns `<'C'><contentions>` `<'R'><spirit RESTARTS>` `<'G'><good packets RX>` |
| `<SOH><4>` | - returns `<SOH><4>` changes serial output to state trace (toggle) |
| `<SOH><5><1>` | - reads all registers of EE**2 and displays (CR,LF between registers) |
| `<SOH><5><2><addr><low><high>` | - writes low and high to the EE**2 register referenced by addr |
| `<SOH><5><3>` | - erases the EE**2 |

Appendix II

Specification for the Cal Packets for Initiation Over the Media

| | | |
|---|---|---|
| calpacket | ::= | \<normalcal\> \| \<localpacket\> |
| normalcal | ::= | \<cal\> \<datastring1\> |
| cal | ::= | \<hex\> \| \<hexbytes\> \<hex\> |
| hex | ::= | 00H \| 01H \| 02H ... FFH |
| hexbytes | ::= | \<hex\> \<hexbytes\> \<hex\> |
| datastring1 | ::= | \<hex\> \| \<hexbytes\> \<hex\><br>note - only applies when MODE = OUTPUT and (parallel or serial string out)<br>- maximum length (29 - # of bytes in cal) |
| localpacket | ::= | \<udase\> \<start\> \<command\> \<end\> |
| udase | ::= | F7H |
| start | ::= | FDH |
| command | ::= | \<download\><br>\<deletepacket\><br>\<deleteall\><br>\<getbaud\><br>\<setbaud\> |
| end | ::= | FEH |
| download | ::= | \<val_00\> \<type\> \<cal\> \<datastring2\> |
| val_00 | ::= | 00H |
| datastring2 | ::= | \<hex\> \| \<hexbytes\> \<hex\><br>note - only applies for MODE = STATUS - maximum length for STATUS/EXPLICIT<br>10 - # of bytes in CAL field<br>STATUS/IMPLICIT<br>19 - # of bytes in CAL field |

Appendix II (cont.)

| | | |
|---|---|---|
| type | ::= | <out_exp> |
| | | <out_imp> |
| | | <stat_exp> |
| | | <stat_imp> |
| out_exp | ::= | <handoff_n_serialstringout> |
| | | <handoff_n_parallelstringout> |
| | | <handoff_n_byteout> |
| | | <handon_n_serialstringout> |
| | | <handon_n_parallelstringout> |
| | | <handon_n_byteout> |
| handoff_n_serialstringout | ::= | 00H |
| handoff_n_parallelstringout | ::= | 01H |
| handoff_n_byteout | ::= | <val_02> <byteout> |
| val_02 | ::= | 02H |
| handon_n_serialstringout | ::= | <val_03> <handshakeon> |
| val_03 | ::= | 03H |
| handon_n_parallelstringout | ::= | <val_04> <handshakeon> |
| val_04 | ::= | 04H |
| handon_n_byteout | ::= | <val_05> <handshakeon> <byteout> |
| val_05 | ::= | 05H |
| handshakeon | ::= | 2 bytes of information |

```
    ---- ---- ---- ----
   | ||| time count in millisecond
   |  Pin X position
   Hi/Lo for Pin X
```

- 2 -

Appendix II (cont.)

```
byteout                 ::=  4 bytes of information

---- ---- ---- ----|---- ---- ---- ----
                             These 2 bytes define ||||Use for time
                             the 8 bit byte       ||||count
                             0 - 00                   Time Mode
                             1 - 01                   0000 for millisecond
                             x - 10                   0001 for second
                             ? - 11 undefined         0010 for minute
                                                      0011 for permanent out_imp                 ::=  <serialstringout>
                             <parallelstringout>
                             <outputbyte> serialstringout         ::=  10H parallelstringout       ::=  11H outputbyte              ::=  <val_12> <byteout> val_12                  ::=  12H stat_exp                ::=  <val_20>
                             <activation_bit_byte>
                             <debounce_time>
                             <dest>
                             <timeout>
                             <reject_outp>
                             <error_outp>
                             <timeout_outp>
                             <good_outp> val_20                  ::=  20H activation_bit_byte     ::=  <bitbyte> --inport value debounce_time           ::=  2 bytes of information ---- ---- ---- ----
                             ||||  Used for time count
                             ||||
                             Time Mode
                             0000 for millisecond
                             0001 for second
                             0010 for minute
```

- 3 -

Appendix II (cont.)

| | | | |
|---|---|---|---|
| dest | ::= | <hex> | -- the destination station number |
| timeout | ::= | <hex> | -- timeout in second |
| reject_outp | ::= | <bitbyte> | -- outport value when REJECT received |
| error_outp | ::= | <bitbyte> | -- outport value when ERROR received |
| timeout_outp | ::= | <bitbyte> | -- outport value when TIMED OUT before any response received |
| good_outp | ::= | <bitbyte> | -- outport value when RETURN RESULT received |
| bitbyte | ""= | 2 bytes of information | |

```
---- ---- ---- ----

These 2 bytes define an 8 bit byte

0 - 00
1 - 01
x - 10  don't care
? - 11  undefined
```

| | | |
|---|---|---|
| stat_imp | ::= | <val_30> <activation_bit_byte> <debounce_time> <dest> |
| val_30 | ::= | 30H |
| deletepacket | ::= | <val_02> <cal> |
| val_02 | ::= | 02H |

- 4 -

Appendix II (cont.)

| | | |
|---|---|---|
| deleteall | ::= | ⟨val_03⟩ |
| getbaud | ::= | ⟨val_05⟩ |
| setbaud | ::= | ⟨val_06⟩ ⟨ascii_bytes⟩ |
| val_06 | ::= | 06H |
| ascii_bytes | ::= | ⟨ascii⟩ \| ⟨asciibytes⟩ ⟨ascii⟩ |
| ascii | ::= | nil \| 20H \| 21H \| 22H .. 7FH |

Appendix III

Specifications of EE Prom Storage

Version 1.0

| | | |
|---|---|---|
| eeprom | ::= | \<header\> \<info\> |
| header | ::= | \<hexbytes\> |
| info | ::= | \<messages\> |
| messages | ::= | \<message\> \| \<message\> \<messages\> |
| message | ::= | \<first CAL\> \<type\> \<ends\> \<bitpattern\> \<conditions\> \<next CALs\> \<ends\> |
| first CAL | ::= | \<hex\> first CAL command |
| type | ::= | \<typemessage\> \<nextmessage\> |
| typemessage | ::= | 00B    output explicit<br>01B    output implicit<br>10B    status explicit<br>11B    status implicit |
| nextmessage | ::= | 000000B 000001B . . . 111111B address of next message |
| ends | ::= | \<ffhs\> |
| ffhs | ::= | \<ffh\> or \<ffh\> \<ffhs\> |
| ffh | ::= | FFH |
| bitpattern | ::= | \<bitbyte\> |
| conditions | ::= | \<hexbytes\>    time and other conditions |
| nextCALs | ::= | \<hexbytes\>    next CAL bytes |

What is claimed is:

1. A programmable consumer device interface, comprising:

media interface means for receiving first signals according to a media format and providing second signals in response thereto;

an interface control unit, including:

a controller operable in response to said second signals and a stored program, a programmable memory means operable to receive, store and provide selected said second signals according to said stored program and said second signals, and a programmable data transceiver operable to provide third signals to said controller in response to said second signals, stored programmable memory signals and said stored program; and transfer means providing selected fourth signals to a consumer device according to signals provided by said controller in response to said third signals and said stored program.

2. The programmable consumer device interface of claim 1, wherein said stored program is operable according to signals stored in said programmable memory means.

3. The programmable consumer device interface of claim 2, wherein said signals stored in said programmable memory means at lease one of interface address, command set and command response data for providing selected response by said controller to said first signals.

4. The programmable consumer device interface of claim 2, wherein said stored second signals comprise at least one of data transceiver timer, control and configuration data.

5. The programmable consumer device interface of claim 4, wherein said stored second signals include internally mapped data, clock and control signals.

6. The programmable consumer device interface of claim 3, wherein said stored second signals include configuration data.

7. For use with a consumer device, a remotely configurable consumer device interface system comprising a medium for conveying data;

a medium interface connected to said consumer device to provide control thereof in response to selected signals provided on said medium according to a program stored on said medium interface;

a means for providing customization signals to said medium interface which determine selected functions of said medium interface according to said stored program;

means for monitoring said functions and for providing a connection initiate signal if a function exceeds a specified performance range; and means for dynamically adjusting said interface according to a correction initiate signal, wherein said means for providing customization signals to said medium interface is thereafter removable from said system, and wherein said medium interface retains said customization signals.

8. The system of claim 7, wherein said means for dynamically adjusting includes said medium interface.

9. For use with a consumer device, a remotely configurable consumer device interface system comprising a medium for conveying data;

a medium interface connected to said consumer device to provide control thereof in response to selected signals provided on said medium according to a program stored on said medium interface; and a means for providing customization signals to said medium interface which determine selected functions of said medium interface according to said stored program, said means for providing customization signals including means for providing at least one of customized interface address, command and command response signals, wherein said interface assumes an address corresponding to said customized interface address, and said interface assumes functions corresponding to said customized command and command response signals, and wherein said means for providing customization signals to said medium interface is thereafter removable from said system, and wherein said medium interface retains said customization signals.

10. A method of selectively controlling a consumer device, comprising the steps of:

providing a medium for data transmission;

providing a programmable interface between said medium and said consumer device;

initially programming said interface to respond to a selected address and to selected commands, and to provide selected signals to said consumer device;

configuring said interface to respond to at least one of a selected medium and a corresponding medium signal format;

storing said address and command signals provided by said initial programming;

sending signals on said medium to provide said selected signals to said consumer device in response to said initial programming.

\* \* \* \* \*